Figure 1:
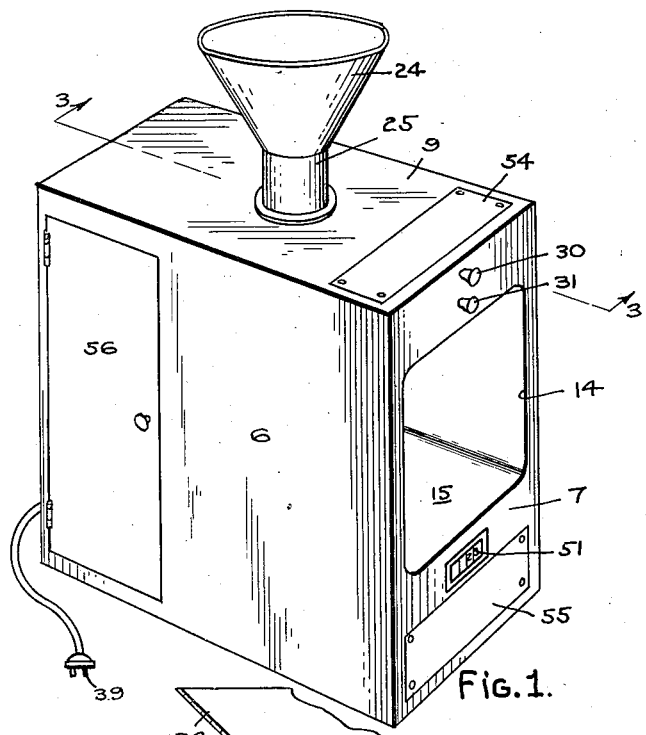

Aug. 5, 1958     F. W. JAMISON     2,846,200
MEASURING AND MIXING DEVICE FOR HOT-CAKE BATTER
Filed June 21, 1956     2 Sheets-Sheet 1

INVENTOR.
FREDERICK JAMISON,
BY
ATTORNEY

Aug. 5, 1958 F. W. JAMISON 2,846,200
MEASURING AND MIXING DEVICE FOR HOT-CAKE BATTER
Filed June 21, 1956 2 Sheets-Sheet 2
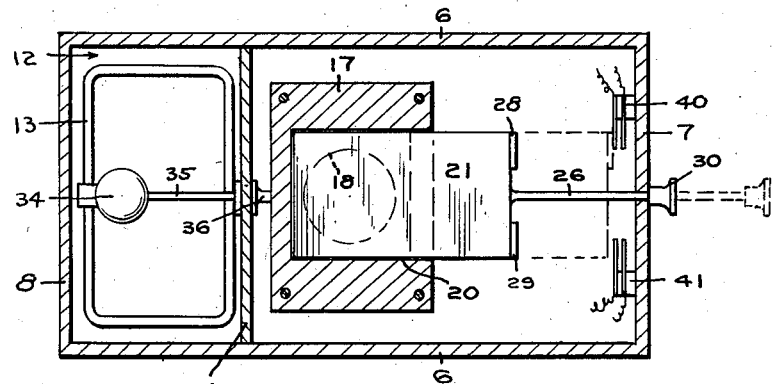
FIG. 4.
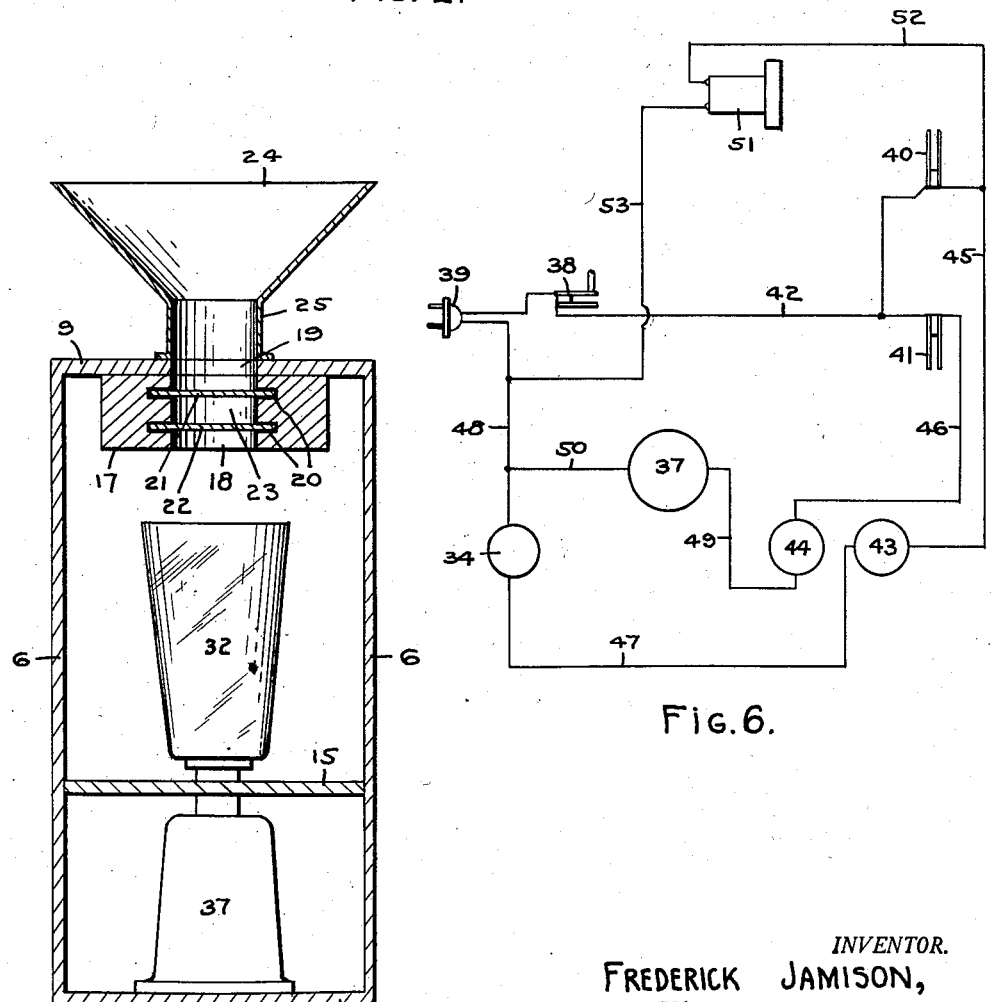
FIG. 5.
FIG. 6.
INVENTOR.
FREDERICK JAMISON,
BY
ATTORNEY United States Patent Office 2,846,200
Patented Aug. 5, 1958

2,846,200

MEASURING AND MIXING DEVICE FOR HOT-CAKE BATTER

Frederick W. Jamison, Coral Gables, Fla.

Application June 21, 1956, Serial No. 592,863

7 Claims. (Cl. 259—24)

This invention relates to improvements in a combined measuring and mixing device for fluent materials such as hot cake batter.

The invention contemplates the device of the above mentioned character whereby to automatically measure a quantity of flour adequate for mixing enough batter to bake one order of three hot cakes, conveying the flour into a mixing device together with a predetermined quantity of milk and then to agitate or mix the flour and the milk a predetermined length of time, all being progressively performed in timed sequence, after which the mixture is removed and the batter placed upon a grill or other cooking device.

The invention contemplates a hopper for the storage of a relatively large quantity of flour, a receptacle for the storage of milk and an electrically driven mixer comprising a removable bowl, agitator and motor together with a measuring valve beneath the hopper and a plurality of micro-switches and agastats or timer switches whereby a predetermined quantity of milk is delivered into the bowl, determined by the timing of one agastat after which the mixer is actuated by its motor a predetermined number of seconds by the second agastat and with the agastats being controlled under the influence of alternately operated measuring valve plates.

The invention further contemplates a counter device actuated under the influence of one valve plate and whereby the operator may readily determine the number of orders filled by the device.

Novel features of construction and operation of the device will be clearly apparent during the course of the following description, reference being had to the accompanying drawings wherein has been illustrated a preferred form of the device and wherein like characters of reference are employed to denote like parts throughout the several figures.

Figure 2:
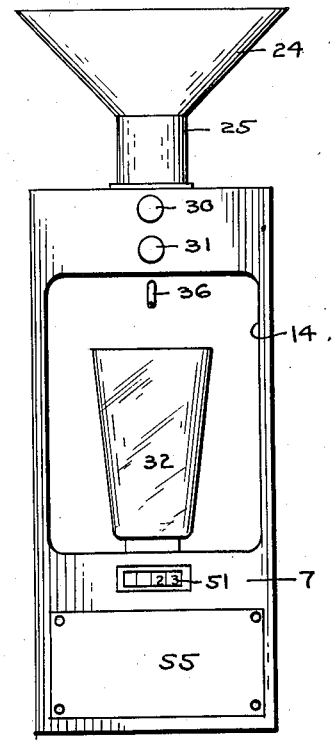
Figure 3:
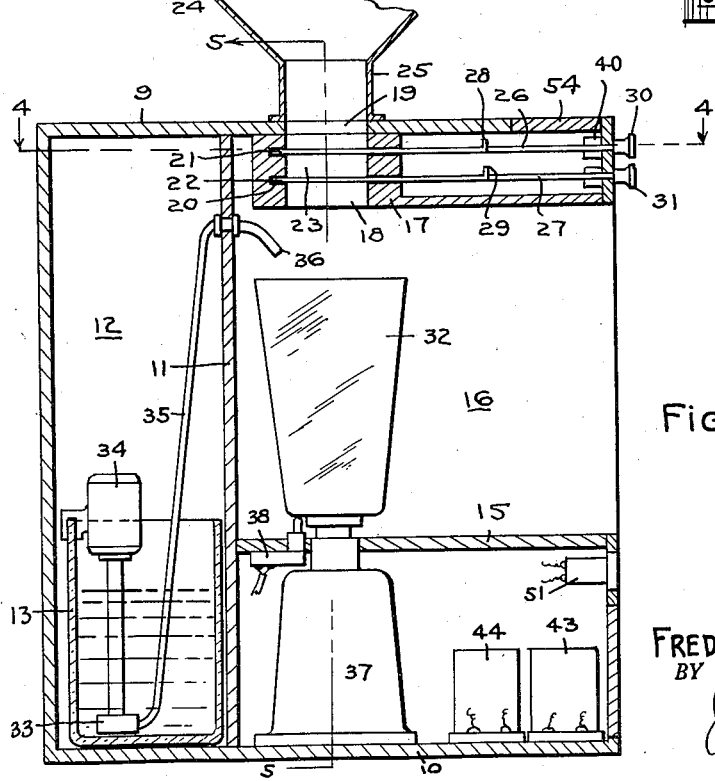

In the drawings:

Figure 1 is a perspective view of a device constructed in accordance with the invention, Figure 2 is a front elevation thereof, Figure 3 is a longitudinal section taken substantially on line 3—3, of Figure 1, parts being shown in elevation, Figure 4 is a horizontal section taken substantially on line 4—4 of Figure 3, Figure 5 is a transverse section taken substantially on line 5—5 of Figure 3, parts being shown in elevation and Figure 6 is a diagrammatic illustration illustrating one form of electrical connections to the several control elements.

In the drawings, the numeral 5 designates a cabinet formed of metal or other desirable material having side walls 6, a front wall 7, a rear wall 8, a top 9 and a bottom 10. A transverse partition 11 provides a rear compartment 12 for the reception of a preferably glass or vitreous container 13 for the reception of milk. The container 13 may obviously be provided with any desirable refrigerating means not shown. The front wall 7 is cut away to form an access opening 14 through which the operator has access to a mixing bowl, to be described. A horizontal partition 15 forms a bottom for a chamber 16 that communicates with the opening 14.

Mounted beneath the top 9 is a measuring device, here illustrated as a block 17 that is cylindrically apertured as at 18 and with the aperture communicating with a cylindrical aperture 19 formed in the top 9 and with the apertures being concentric. The block 9 is horizontally slotted at 20 in spaced apart relation for the reception of slide-valve plates 21 and 22. The plates 21 and 22 thus form a cylindrical measuring chamber 23 of a capacity to receive and measure approximately two and three quarter ounces of flour. Disposed concentric to the aperture 19 is a preferably conical hopper 24 having a lower discharge tube 25 through the medium of which flour within the hopper is conveyed downwardly into the measuring device 17. The hopper and the tube 24 and 25 may be formed of plastic, metal or other desirable material calculated to have a smooth interior surface that facilitates the movement of the flour to the measuring device. Plates 21 and 22 are alternately shiftable under the influence of rods 26 and 27 that extend forwardly from lip portions 28 and 29 of the plates and project through the forward wall 7 in spaced apart relation where they are provided with knobs 30 and 31. It will therefore be apparent that when the knob 30 is actuated to shift the plate 21 horizontally, flour will pass downwardly to fill the chamber 23 and, when the plate 21 is shifted to a closed position and then the plate 22 shifted to an open position by the knob 31, the flour within the chamber 23 will drop downwardly into a mixing bowl 32, preferably formed of glass. The position of the bowl 32 is concentric to the cylindrical opening 18 in its normal position of operation.

Supported within the container 13 is a pump 33, driven by an electric motor 34. Connected with the pump 33 is a flexible, preferably plastic tube 35 that extends upwardly to a point adjacent the top 9 where it is connected to a nozzle 36. The nozzle 36 extends through the partition 11 and is angled to dispense a predetermined quantity of milk from the container 13 to a mixing bowl 32, in a manner to be presently described. Fixed upon the bottom 10 is a conventional electrically driven mixer device which comprises an agitator containing bowl 32 and an electric motor 37, the clutch end of which projects upwardly through the partition 15 for connection with the rotatable agitator carried by the bowl 32 and through the medium of which the material within the bowl will be agitated and mixed. The mixer motor 37 and its clutch element, not shown, is co-axial with respect to the bowl 32 and the aperture 18 of the valve 17. Mixers of this type are well known and are in general use.

Fixed with relation to the partition 15 and projecting thereabove is a switch element 38. The switch element is positioned in the path of downward movement of the bowl 32 so that the switch will be actuated when the bowl is positioned in clutched arrangement with the motor 37 and whereby the circuit of the device is energized from a source of electrical energy, such as the conventional pronged plug 39. Disposed in the path of movement of the lips 28 and 29 are micro-switches 40 and 41. The micro-switches 40 and 41 are connected to one side of the switch 38 by a common conductor 42. Preferably disposed within the cabinet and fixed upon the bottom 10 is a pair of agastats or timer switches 43 and 44. The switch 43 is connected at one side of the switch 40 by a conductor 45. The switch 44 is connected to the switch 41 by a conductor 46. The opposite side of the switch 43 is connected to the motor 34 by a conductor 47 and the opposite side of the motor 34 is connected to the ground by a conductor 48. The opposite side of the switch 44 is connected to the motor 37 by a conductor 49, while the opposite side of the said motor is connected to the ground 48 by a conductor 50. Mounted within the front wall 7 at any desirable point is a counter device 51. The counter device 51 is of any conventional construction and is preferably electrically operated by a solenoid, not shown, and whereby the operator may determine the number of times the machine has operated. One side of the counter is connected to the conductor 45 through a conductor 52, while the opposite side of the counter is connected to the ground 48 by a conductor 53. Panels 54 and 55 are provided in the cabinet whereby to have access to the switches 40 and 41 and the agastats 43 and 44 and the mixer. One side wall of the cabinet is provided with a closure door 56 whereby to permit of access to the receptacle 13 for replenishing the supply of milk or for removing and cleaning the receptacle.

The operation of the device is as follows:

Assuming that the hopper 24 and spout 25 are filled with flour and the receptacle 13 is provided with a supply of milk, the plug device 39 is plugged into a convenient outlet receptacle adjacent to the cabinet. The device is now ready for operation. When an order for hot cakes is received, the operator places the agitator in bowl 32 into clutched engagement with the clutch means of the mixer motor 37, such action actuating the switch 38 which normally energizes the system for operation. It is pointed out, that whenever the bowl 32 is removed from the cabinet, the system is deenergized. Now with the bowl in position as illustrated, the operator first actuates the valve plate 21 by pulling the knob 30 outwardly to its maximum position, permitting the body of flour to fall downwardly to impinge upon the valve plate 22 and to completely fill the chamber 23. With the knob 30 pulled outwardly, the lip 28 engages and closes the switch 40. Current will then flow from the source of energy through the switch 38, conductor 42, conductor 45, agastat 43, conductor 47 and energizes the motor 34 of the pump 33. The agastat 43 is timed to permit the operation of the motor 34 just long enough to force approximately 4½ ounces of milk through the tube 35 and from the nozzle 36 to the bowl 32. After the motor 34 has functioned for a predetermined time, it is deenergized by the agastat 43. The knob 30 is then actuated in a reverse direction closing the valve plate 21 after which, the operator pulls the knob 31 outwardly dropping the contents of the chamber 23 into the bowl 32. When the valve 22 has been shifted to its maximum open position, its lip 29 engages and closes the switch 41. Current will then flow from the source of energy through the switch 38, conductor 42, switch 41, conductor 46, through the agastat 44, conductor 49, to the motor 37, then through ground wire 50 to the negative side of the source of current. It will therefore be apparent, that the actuation of the valve 22 places the mixer in operation for a predetermined number of seconds determined by the respective agastat. In actual use, the agastat 44 has been timed to operate the mixer agitator for a period of approximately 20 seconds, this being sufficient to thoroughly agitate and mix the flour and milk in the bowl 32. When the mixer is deenergized under the influence of the agastat 44, the operator reaches inwardly through the opening 14 and removes the bowl 32 with its mixed contents and proceeds to pour the mixed contents upon a grill or other cooking device. It is desirable that a counter be provided whereby the operator may quickly and easily determine the number of times the machine has been operated in a given period of time. The counter 51 is arranged to operate when the switch 40 is closed, causing a step-by-step counting action for each operation of the valve 21. It will be apparent, that whenever the switch 40 is closed, the current flowing through the conductor 45, is bypassed through the conductor 52 to actuate the counter 51. Thus, the complete cycle of operation requires less than 30 seconds.

It will be apparent from the foregoing that a very novel and simple arrangement of parts have been provided whereby to quickly and easily measure and mix hot cake batter in a minimum of time and to assure that each individual order will be freshly prepared. The electrical units are of conventional construction, yet perform a very novel sequence of operation carrying out the several steps of first measuring a precise quantity of flour, furnishing a precise quantity of milk, then dropping the measured quantity of flour into a mixing bowl where it is agitated in a matter of seconds, providing just enough of a mix to bake three conventional size hot cakes. The device is simple in construction, is strong, durable, cheap to manufacture and most effective for the purposes set forth. The device thus assures that the mix will be fresh in each instance and the customer is assured of a baked product that is light and palatable and avoids the use of batter that is premixed and stands for a relatively long time, thus destroying its expected and desired quality.

It is to be understood that the invention is not limited to the precise arrangement of parts, but that changes are contemplated as readily fall within the spirit of the invention as shall be determined by the scope of the subjoined claims.

Having described my invention, what I claim as new and desire to secure by Letters Patent is:

1. A combined measuring and mixing device for hot-cake batter comprising a cabinet, a hopper supported upon the cabinet for the support of flour, a measuring valve device within the cabinet and communicating with the hopper, the measuring device including a pair of spaced, separately operable valve plates the space between which constitutes a measuring chamber, a control means for each of the valve plates, a fluid container disposed in the cabinet, a mixer device within the cabinet which comprises an agitator containing bowl and a motor for actuating said agitator, said bowl being disposed below a discharge opening leading from said measuring chamber, a plurality of means operable under the influence of the actuation of one valve plate to dispense a quantity of fluid from the container to the bowl and simultaneously fill the measuring chamber with flour and means operable under the influence of the actuation of the other valve plate for discharging the measured quantity of flour to the bowl and actuating the agitator of the mixer device, the actuation of the fluid dispensing means and the actuation of the mixer being time-controlled.

2. The structure according to claim 1, wherein a counter device is operable under the influence of the operation of one valve plate to indicate progressively each complete cycle of operation of the device.

3. A measuring and mixing device for fluent materials such as hot-cake batter and wherein a measured quantity of flour is mixed with a measured quantity of milk, comprising a chambered cabinet having a front opening, a hopper disposed upon the top of the cabinet, a measuring valve embodying valve plates disposed in the cabinet and in communication with the hopper, the valve plates being alternately operable and with the valve plates being arranged in spaced apart relation whereby to constitute a measuring chamber, means for shifting the valve plates whereby the shifting of one plate permits the filling of the measuring chamber while the shifting of the other plate discharges the measured flour, a mixer device disposed in the cabinet comprising a removable mixing bowl having an agitator therein and a motor for actuating said agitator, a milk container within the cabinet provided with a pump, a tube leading from the pump that is connected to a nozzle and the nozzle being directed to project a predetermined quantity of milk to the bowl, means actuatable by the shifting of the first valve plate to actuate the pump and means actuatable by the shifting of the second plate for discharging the measured flour into the bowl and to actuate the motor of the mixer, the pump and the mixer motor being individually time-controlled.

4. A measuring and mixing device for hot-cake batter wherein a measured quantity of flour is mixed with a measured quantity of milk and whereby to furnish freshly mixed batter for each individual order of hot-cakes, comprising a cabinet that is partitioned to form chambers, one chamber opening through a front wall of the cabinet, a flour supporting hopper fixed upon an upper wall of the cabinet and that communicates through an opening in the upper wall, a measuring valve device beneath the upper wall and with the valve being apertured and concentric to the hopper and whereby to receive flour from the hopper, the valve device being horizontally slotted and with the slots being spaced apart, valve plate slidable in the slots and whereby to extend across the aperture, the valve plates jointly providing a measuring chamber, rods connected with each valve plate and that extend through the front wall of the cabinet, a mixer device in the cabinet comprising a removable mixer bowl having an agitator therein and a motor for actuating said agitator and with the bowl being disposed concentric to and beneath the measuring chamber, a milk receptacle, a pump within the receptacle, a tube leading from the pump and communicating with a nozzle that is directed to discharge a measured quantity of milk to the bowl, control means whereby the pump and the motor of the mixer are alternately actuated when the valve plates are actuated to first fill the measuring chamber and then to discharge the measured flour into the bowl and timing means for both the pump and the mixer motor.

5. The structure according to claim 4, in combination with a source of electrical energy, a switch device in the cabinet and that is connected to the source of energy, the said switch being adjacent to and in the path of operative positioning of the bowl and whereby to energize a circuit in the device, switch elements arranged in the path of movement of each valve plate, an electric motor for driving the pump, the said mixer motor being electrically driven, timer devices arranged in the cabinet and with one timer device being electrically connected with one switch element and the pump motor, the other of said timer devices being electrically connected to the other switch element and the electrically driven mixer motor, the first named switch being electrically connected to each of the switch elements, the operation of the valve plates alternately serving to first energize the pump motor and then to energize the motor of the mixer device.

6. The structure according to claim 4, wherein each of the valve plates are provided at their free ends with a lip portion, an electrical switch disposed in the path of movement of each valve plate and engageable by the lip portions and whereby to alternately actuate the switches, an electrical connector from a source of electrical energy that is closed when the bowl is disposed in operative position, a conductor from the connector to each of the switches, timer elements in the cabinet and a motor for driving the pump, one switch being electrically connected to one timer and to the motor whereby a measured quantity of the milk is directed into the bowl when an upper valve plate is actuated to fill the measuring chamber with flour, the motor of the mixer device being electrically driven, the other switch device being electrically connected to the other timer device and the mixer motor and whereby the actuation of the lower valve plate energizes the mixer motor and discharges the measured quantity of flour into the bowl, the pump motor and the mixer motor being automatically deenergized by the timer devices after a predetermined cycle of operation.

7. A fluid dispensing device in combination with an electrically driven mixer device comprising a removable mixing bowl, an agitator therein and a motor for actuating said agitator, a container for the reception of the fluid to be dispensed, a pump within the container, a motor for driving said pump, a fluid line leading from the pump to a discharge nozzle and with the nozzle being directed to discharge fluid into the bowl, a source of electrical energy, a pair of electrical timer devices and switches and with the timer devices and the switches being connected to the source of energy, the timer devices also being connected to the pump motor and to the mixer motor, one of said switches when actuated, serving to energize its timer to first actuate the pump for a predetermined length of time for discharging a measured quantity of fluid to the bowl, the said timer device interrupting the flow of energy to the pump after the predetermined discharge of fluid the other said timers then energizing the said mixer motor for a predetermined period after which the electrical energy is interrupted.

References Cited in the file of this patent

UNITED STATES PATENTS

| | | |
|---|---|---|
| 1,298,897 | Coffin | Apr. 1, 1919 |
| 1,348,222 | Holmes | Aug. 3, 1920 |
| 1,521,038 | Moore | Dec. 30, 1924 |
| 1,561,439 | Ackermann et al. | Nov. 10, 1925 |
| 2,314,421 | Peterson | Mar. 23, 1943 |
| 2,550,093 | Smith | Apr. 24, 1951 |
| 2,564,852 | Mason et al. | Aug. 21, 1951 |